Nov. 26, 1968   J. W. HUFFMAN ET AL   3,413,582
SWITCH WITH MANUAL AND THERMOSTATIC CONTROL
Filed Jan. 3, 1966   4 Sheets-Sheet 1

INVENTORS
JOHN W. HUFFMAN &
BY FRANK T. PIACENT

Harry O. Ernsberger
ATTORNEY

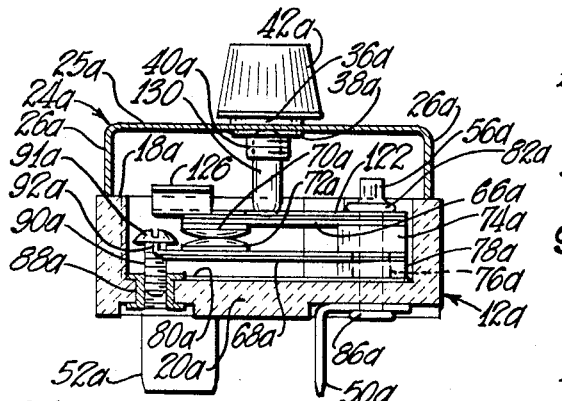

INVENTORS
JOHN W. HUFFMAN
BY & FRANK T. PIACENT
Harry O. Ernsberger
ATTORNEY

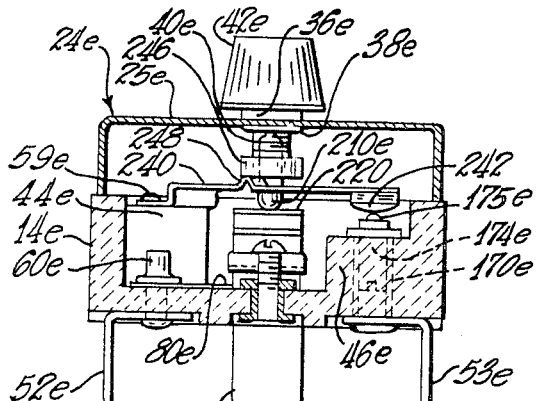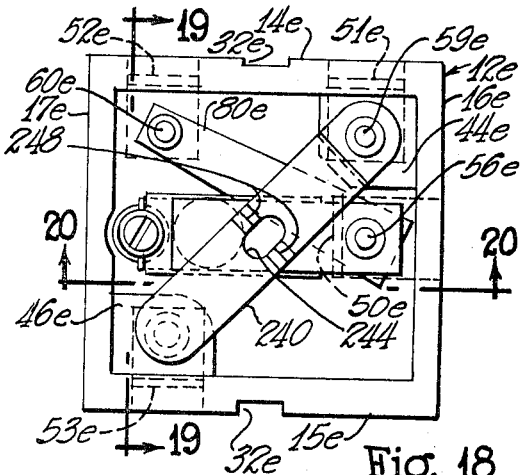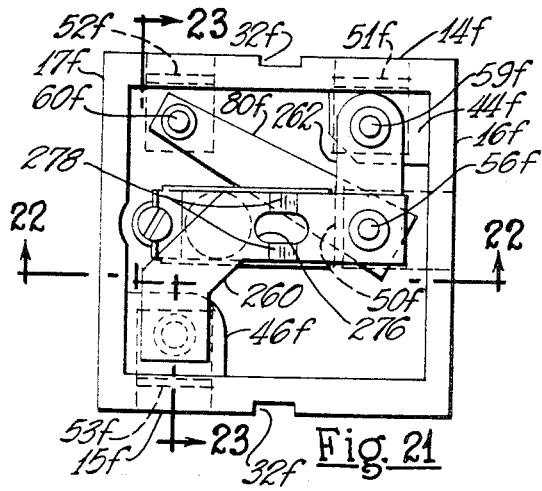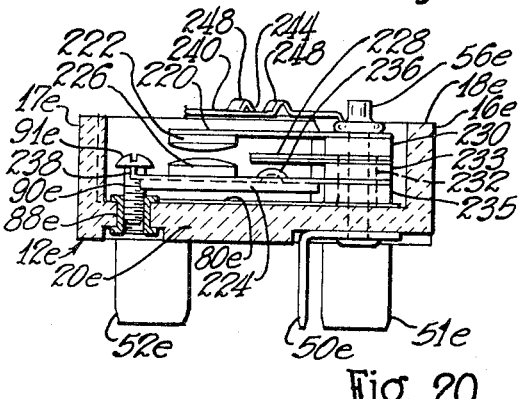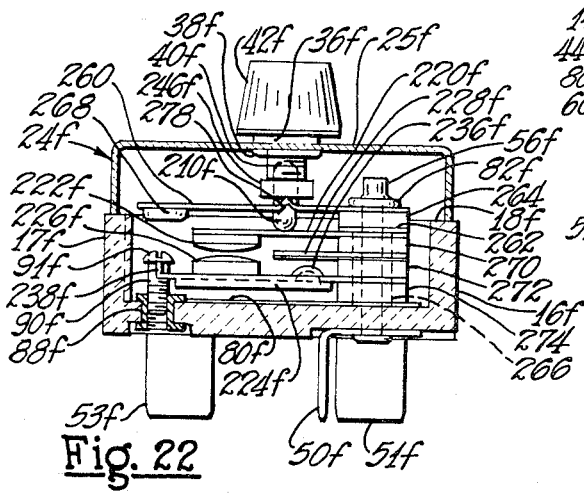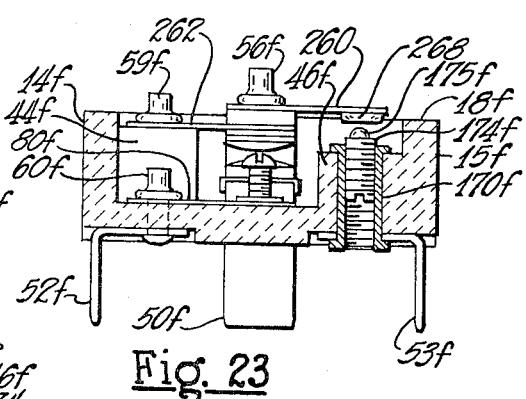

United States Patent Office 3,413,582
Patented Nov. 26, 1968

3,413,582
SWITCH WITH MANUAL AND THERMOSTATIC CONTROL
John W. Huffman and Frank T. Piacent, Mansfield, Ohio, assignors, by mesne assignments, to Emerson Electric Co., St. Louis, Mo., a corporation of Missouri
Filed Jan. 3, 1966, Ser. No. 518,051
5 Claims. (Cl. 337—42)

ABSTRACT OF THE DISCLOSURE

This invention relates to a thermostat switch construction having manually operable means for adjusting a component of the switch mechanism to establish thermoresponsive control of an appliance, the construction embodying a housing of lava fashioned to facilitate modifications of the switch mechanism to adapt the switch mechanism for use with various appliances and for use with a wide range of current capacities.

---

This invention relates to switch mechanism and more especially to a switch mechanism contained in a switch housing wherein the switch mechanism may be modified to render the mechanism usable for various purposes and for controlling various appliances or instrumentalities.

Heretofore it has been a practice in producing or manufacturing combined manual and thermostatically controlled switch mechanism for a particular use to provide an individual design of switch components and switch housing especially suited for the intended purpose. Switch mechanism of this character are used for various purposes such as controlling electrically heated appliances, ventilating fans, room-type air conditioners, space heaters and the like, where a thermostat control is essential to proper operation of the appliance or instrumentality.

In the manufacture of switches of this character little, if any, attention is given to the provision of a switch housing construction of compact size and configuration or to switch mechanisms for installation therein to enhance the interchange of components to render more economical the volume production of comparatively small switch mechanisms adaptable for various uses.

The present invention embraces the provision of a thermostat switch construction having manually operable means for predetermining or manually setting a component of the switch mechanism to establish and maintain thermo-responsive control of an appliance or instrumentality wherein the switch mechanism may be modified for particular purposes and the switch mechanisms fashioned for assembly and installation in a comparatively small housing of rigid insulating material suitable for use with many different appliances or instrumentalities to be controlled.

Another object of the invention is the provision of a thermostat switch mechanism which is infinitely variable to obtain and maintain accurate control of temperature of an appliance or control of a variable temperature environment.

Another object of the invention resides in a housing construction for a switch mechanism adaptable to accommodate switch means of single or double pole type and which is of compact construction to accommodate switch mechanisms suitable for use with a wide range of current capacities.

Another object of the invention is the provision of switch mechanism of the infinitely variable thermostat type embodying one or more thermoresponsive elements to modify and effectively control the current "on" and "off" periods.

Another object of the invention is the provision of a thermostat switch embodying an auxiliary heating means to promote desired cycling times or periods between current "on" and current "off" positions.

Further objects and advantages are within the scope of this invention such as relate to the arrangement, operation and function of the related elements of the structure, to various details of construction and to combinations of parts, elements per se, and to economies of manufacture and numerous other features as will be apparent from a consideration of the specification and drawing of a form of the invention, which may be preferred, in which:

FIGURE 6 is a top plan view similar to FIGURE 2 illustrating a form of switch mechanism equipped with contact means for an auxiliary circuit;

FIGURE 7 is a sectional view taken substantially on the line 7—7 of FIGURE 6;

FIGURE 8 is a sectional view taken substantially on the line 8—8 of FIGURE 6;

FIGURE 9 is a sectional view taken substantially on the line 9—9 of FIGURE 6;

FIGURE 10 is a top plan view of the housing and a switch mechanism of the single pole thermostat type embodying an auxiliary heater for influencing the cycling period of the switch mechanism;

FIGURE 11 is a sectional view taken substantially on the line 11—11 of FIGURE 10;

FIGURE 11A is an end view of a switch arm and bimetal element shown in FIGURE 11;

FIGURE 18 is a plan view of the housing and a double pole infinite switch mechanism of the invention;

FIGURE 19 is a sectional view taken substantially on the line 19—19 of FIGURE 18;

FIGURE 20 is a sectional view taken substantially on the line 20—20 of FIGURE 18;

FIGURE 21 is a plan view of the housing enclosing a double pole switch mechanisms of the infinite variable type;

FIGURE 22 is a sectional view taken substantially on the line 22—22 of FIGURE 21; and FIGURE 23 is a sectional view taken substantially on the line 23—23 of FIGURE 21.

Figure 1:
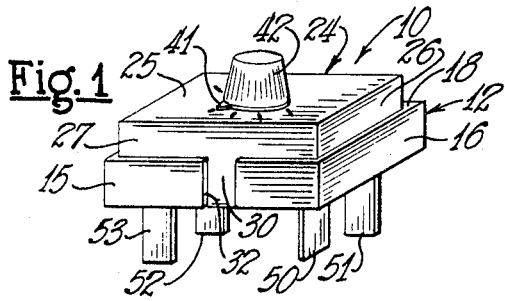
FIGURE 1 is an isometric view of a switch housing for enclosing switch mechanism construction of the invention.

The housing construction and switch mechanisms are adaptable for many and various uses wherein reorientation of components within the switch housing may readily be made without modifying the housing construction.

Referring to the drawings in detail and initially to FIGURES 1 through 5, there is illustrated an enclosure 10 for switch mechanism which is inclusive of a housing 12 fashioned of high temperature resistant rigid insulating material, such as molded lava, ceramic or the like.

The switch housing 12 is of substantially square configuration in plan view and includes opposed side walls 14 and 15 and a second pair of opposed side walls 16 and 17, the upper edges of the walls terminating in a planar surface 18 which is preferably parallel to a floor portion 20 of the housing integral with the side walls.

The housing 12 is provided with a cover 24 fashioned of sheet metal of substantially square configuration having a planar upper surface 25 and pairs of opposed side walls 26 and 27. The walls 27 have downwardly projecting ears or tongues 30 which engage in slots 32 in the walls 14 and 15, the ends of the tongues 30 having inwardly extending projections 34 which engage ridges at the lower terminals of the slots 32, as shown in broken lines in FIGURE 5. The lower edges of the walls 26 and 27 of the metal cover terminate in a common plane for engagement with the planar surface 18 of the housing 12.

The central region of the planar portion 25 of the metal cover 24 is provided with an opening accommodating a bushing 36 having a tenon portion extending through the opening and swaged as shown at 38 to secure the bushing 36 to the cover. The bushing 36 is internally threaded to accommodate a threaded shaft 40, the latter supporting a manipulating knob 42 for rotating the shaft 40. Molded integrally with the housing 12 in diagonally opposite corner regions are raised portions, buttresses or bosses 44 and 46.

One form of switch mechanism disposed within the housing 12 is illustrated in FIGURES 2 through 5, which comprises a double pole switch in conjunction with thermoresponsive or bimetal elements and including means providing for a positive "off" condition of the switch means. The bottom surface of the floor 20 of the housing is fashioned with recess 48 which accommodates L-shaped terminals 50, 51, 52 and 53. The terminal 50 is held in place by a headed shaft or pin 56, the pin 56 extending through components of a switch stack construction 58 contained within the housing 12.

The terminals 51, 52 and 53 are secured to the housing by means of pins 59, 60 and 61. The switch construction 58 is inclusive of a first switch arm 66 and a second switch arm 68, and switch arm 66 being provided with a contact 70 and the switch arm 68 provided with a contact 72 for cooperation with a contact 70. Each of the switch arms 66 and 68 is fashioned of bimetal, that is, two layers of metal having different coefficient of expansion bonded together to form a thermoresponsive component.

The bimetal switch arms or members are fashioned to have different rates of flexure per unit of temperature change for a purpose hereinafter explained. In the embodiment shown in FIGURES 2 through 5, the lower bimetal switch arm 68 has a higher flexure rate than the upper bimetal switch arm 66. The stacked switch construction 58 is mounted by means of the metal pin 56.

Mounted upon the pin 56 is an annular member 74 of rigid insulating materal, such as lava, the member 74 having a tenon portion 76 of reduced diameter projecting through an opening in the lower bimetal switch arm 68. Surrounding the tenon 76 is a metal collar 78.

Figure 2:
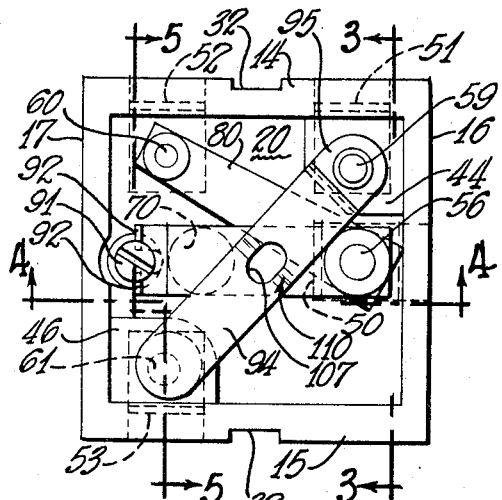
FIGURE 2 is a top plan view of the housing construction with the cover removed and illustrating one form of switch mechanism of the invention contained within the housing.
Figure 4:
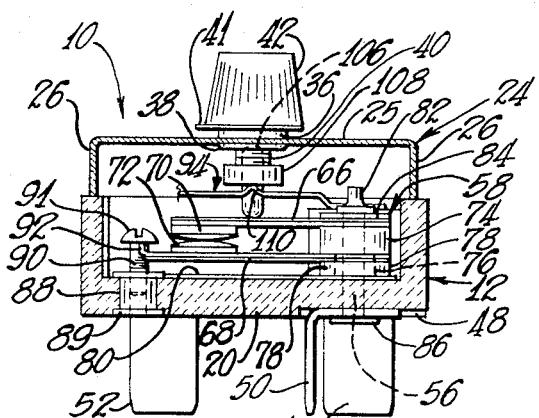
FIGURE 4 is a sectional view taken substantially on the line 4—4 of FIGURE 2.
Figure 3:
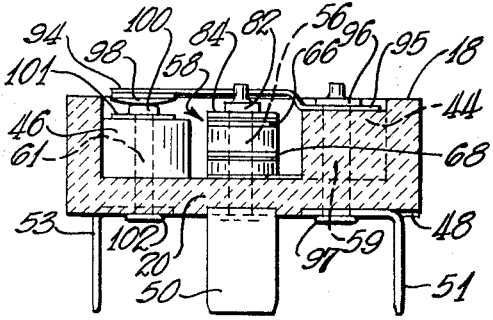
FIGURE 3 is a sectional view taken substantially on the line 3—3 of FIGURE 2.
Figure 5:
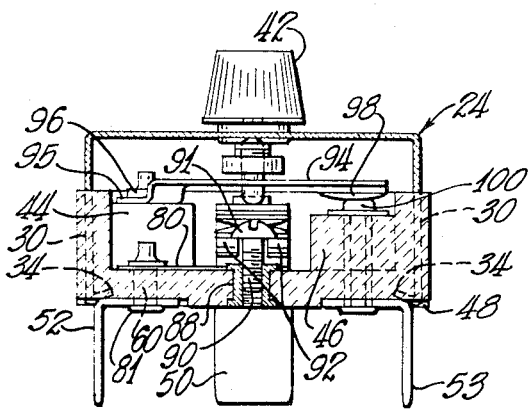
FIGURE 5 is a sectional view taken substantially on the line 5—5 of FIGURE 2.

Supported on the interior surface of the housing floor 20 is a resistance heater strip 80 of metal, shown in FIGURES 2 and 3, the resistance strip 80 having an opening adjacent one end accommodating the insulating tenon 76. The strip 80 is in metallic contact with the metal collar 78 and is insulated from the pin 56. The other end of the strip 80 has an opening accommodating the pin 60 and engages the pin 60 to establish electrical connection with the terminal 52. After assembly of the pin 60 with member 80 and terminal 52, the end of the pin 60 is swaged to form the head 81 to secure these components in fixed relation.

The annular member 74 electrically insulates the switch arm 66 from the switch arm 68. The upper portion of the pin is provided with a circular shoulder or flange 82, a washer 84 being disposed between the flange 82 and the switch arm 66. The components are assembled upon the pin 56 and the portion of the pin extending through the terminal 50 is swaged to form the head 86 to thereby secure the switch stack components in assembled relation.

Disposed in an opening formed in the floor 20 of the housing is a sleeve or bushing 88, an end of which is swaged as at 89 to secure the bushing to the housing. The sleeve or bushing 88 is interiorly threaded to accommodate a screw 90 provided with a head 91. The end region of the bimetal switch arm 68 has upwardly extending portions 92 adapted to be engaged with the head 91 of the screw 90 to provide for a positive "off" condition, viz. to effect positive separation of the contacts 70 and 72 when the manually operable member 42 is moved to an "off" position.

The switch arrangement, shown in FIGURES 2 through 5, includes a double pole construction. Disposed diagonally of the housing 12 is a third switch arm or flexible switch member 94, one end portion 95 of the switch member 94 lying contiguous and in contact with the upper surface of the boss or raised portion 44 of the housing. The portion 95 has an opening accommodating the pin 59, the pin having an annular flange or abutment 96 engaging the switch arm 94.

After assembly of the switch arm 94 on the pin 59, the end of the pin adjacent terminal 51 is swaged to form a head portion 97 to secure the terminal 51 and switch arm 94 to the housing. The opposite end of the switch arm 94 is provided with a contact 98 for cooperation with a fixed contact 100, the latter being a head portion on the pin 61, a washer 101 being disposed between the contact portion 100 and the raised portion 46. After assembly of the washer 101 and terminal 53 on the pin 61, the end of the pin is swaged to form a head 102, shown in FIGURE 3.

The knob or member 42 provides a manually operable means for moving the switch arms 94 and 66 to complete or interrupt the circuit through both current supply conductors. The threaded shaft 40, supporting the knob 42 is interiorly bored or recessed to accommodate a pin 106, the pin extending through an elongated opening 107 in the switch arm 94, the lower end of the pin engaging the upper surface of the first switch member 66. Surrounding the pin 106 is an annular member 108 of insulating material, such as lava.

The member 108 being disposed between the lower end of the shaft 40 and raised portions 110 formed on the switch arm 94 at opposite sides of the elongated slot 107. The distance between the region of engagement of the raised portions 110 with the annular member 108 and the region of engagement of the lower end of the pin 106 with the switch arm 66 is such that manual rotation of the knob 42 and shaft 40 in one direction flexes the switch arm 94 downwardly to engage the contact 98 carried thereby with the contact 100 and to engage the contacts 70 and 72 to establish one circuit through the terminals 50 and 52 and a second circuit through terminals 51 and 53.

One set of the terminals is connected with one current supply line and the current consuming appliance, and the other set is connected with the other current supply line and the appliance. The switch arms 66, 68 and 94 are prestressed in an upward direction so that they are normally in open circuit positions when the manipulating knob 42 is moved to an "off" position.

The circuit controlling functions of the switch mechanism shown in FIGURES 1 through 5 are as follows: The two current supply conductors are connected to the terminals 50 and 51 and the terminals 52 and 53 connected by conductors (not shown) with an instrumentality or appliance to be manually and thermostatically controlled or the current cycled to the instrumentality through the action of the thermoresponsive elements 66 and 68. The operator rotates the knob 42 in one direction to rotate the shaft 40 and thereby engage contact 70 with contact 72 and engage contact 98 with contact 100.

Current flow is established through terminal 52, pin 60, resistance heater 80, collar 76, the lower bimetal switch arm 68, through contacts 70 and 72, bimetal switch arm 66 and pin 56 to the terminal 50. Current flow through the other side of the line is established through terminal 53, pin 61, contacts 100, 98, switch arm 94 and pin 59 to the terminal 51. Current flow through the resistance member or heater strip 80 generates heat which affects or influences the bimetal switch arms or members 66 and 68, causing them to be flexed downwardly.

While the flexing rates of the bimetal switch arms 66 and 68 are different, both switch arms, under the influence of temperature variations will be flexed in the same direction. Due to the difference or differential in the flexing rates of the bimetal arm 66 and the arm 68, the arm 68 moves through a greater distance of flexure.

Thus under increasing temperature in the housing the contact 72 eventually moves out of engagement with the contact 70, interrupting the circuit to the appliance. With current interruption, the resistance strip 80 ceases to generate heat and the bimetal switch arms 66 and 68 become cooled and move upwardly but at different rates, the contacts 70 and 72 eventually being reengaged to reestablish current flow to the appliance and through the resistance strip 80 to again generate heat for influencing the bimetal switch members.

The provision of two bimetal switch arms flexing in the same direction under temperature variations is for the purpose of retarding or slowing down the cycling action of the switch members 66 and 68. Thus, during circuit closed positions of the switch members, the heat generated from current flow through the strip 80 flexes both elements 66 and 68 in a downward direction as viewed in FIGURE 4 but at different rates so that a period of increased delay is established to prolong the "current on" condition.

Upon disengagement of the contact 72 with the contact 70, the "current off" cycle is increased through the differential flexing rates of the bimetal elements thus appreciably prolonging the current "off" cycle of the switch mechanism. When it is desired to manually interrupt current flow to the instrumentality or appliance being controlled, the operator moves the knob 42 to a current "off" position.

This movement permits the switch member 94, which is prestressed in an upward direction, to separate the contacts 98 and 100 and the lava pin 106, being moved upwardly, relieves pressure on switch member 66 which also moves upwardly because it is prestressed upwardly to normally occupy a circuit interrupting position. The portion 92 of the bimetal switch arm 68 engage the head 91 of the screw 90 when the arm 68 is flexed upwardly thereby positively separating the contacts 70 and 72 to assure interruption of the current flow to the instrumentality irrespective of the temperature or thermal environment within the housing 12.

The rotatable shaft 40 and knob 42 may be manually adjusted to heat control positions for different temperature ranges desired for the instrumentality being controlled, the indicator 41 on the knob 42 cooperating with indicia on the portion 25 of the cover 24 for indicating the relative heat control positions for various temperatures for the appliance. The switch may be used to control electrically heated appliances, air conditioners or other instrumentalities where automatic cycling or thermal control is desired.

FIGURES 6 through 9 illustrate a switch construction of a single pole type embodied in the switch housing of the character hereinbefore described. In this form the housing 12a is of the same construction as that shown in FIGURES 1 through 5 and hereinbefore described, the housing comprising opposed side walls 14a, 15a and opposing side walls 16a and 17a, the upper edges of the walls terminating in a planar surface 18a, the housing having a floor 20a.

The housing is provided with a cover of the same construction as the cover 24 shown in FIGURE 1. The cover 24a comprises a planar portion 25a and pairs of side walls 26a and 27a.

The side walls 27a have depending tongues 30a disposed in slots 32a in the side walls 14a and 15a, the ends of the tongues 30a having portions 34a engaging ridges defining the lower ends of the slots. The planar portion 25a of the cover has an opening receiving a bushing 36a, the tenon portion thereof being swaged as shown at 38a for securing the bushing 36a to the cover. The interior of the bushing 36a is threaded to accommodate a threaded shaft 40a supporting a manipulating knob 42a.

The switch construction disposed in the housing 12a is of the single pole type and includes an auxiliary contact arrangement for controlling a second instrumentality not subject to thermostatic control, the switch construction including means for providing a positive "off" condition of the switch components. The floor 20a has recesses accommodating L-shaped terminals 50a, 52a and 53a. The terminal 50a is held in place by a headed shaft or pin 56a which extends through components of the switch stack construction.

The terminal 52a is secured to the housing by a headed pin 60a. The opening in the raised portion 44a is closed by a plug 120. The terminal 53a is secured to the housing by means of an internally threaded sleeve 136 in which is mounted a threaded member or screw 137, the upper end 138 forming a contact for cooperation with the contact 128.

The switch construction includes a first switch arm 66a and a second switch arm 68a respectively provided with contacts 70a and 72a. Each of the switch arms is fashioned of bimetal so that each forms a thermoresponsive element, the bimetal switch arms 66a and 68a having different rates of flexure per unit of temperature to provide for longer cycling current "on" and current "off" periods, the switch arm 68a having the higher flexure rate.

Mounted adjacent the upper switch arm 66a is a third switch arm or member 122 fashioned of spring metal, not of bimetal construction. The switch members 66a, 68a, 122 and terminals 50a are held in assembled relation by the pin 56a. The mounting of these switch members is similar to the mounting of the switch members 66 and 68 shown in FIGURE 4. An annular member 74a, of insulating material, such as lava, on the pin 56a has a tenon portion 76a projecting through an opening in the switch arm 68a.

Supported on the floor of the housing is a metal resistance heater strip 80a having an opening accommodating the tenon 76a. A metal collar 78a surrounding the tenon 76a is in direct contact with the heater strip 80a and the switch arm 68a. The resistance strip 80a has an opening accommodating the pin 60a, the strip engaging the pin to establish electrical connection with the terminal 52a. The member 74a electrically insulates the switch arm 66a from the switch arm 68a.

In assembling the switch construction, the components 122, 66a, 74a, 68a, 78a, 80a and the terminal 50a are assembled on the pin 56a and the lower end of the pin swaged as at 86a to secure the components in assembled relation. The upper end of the pin 56a has a flange or abutment 82a engaging the switch member 122. Disposed in an opening in the housing floor 20a is an internally threaded metal bushing 88a accommodating a screw 90a provided with a head 91a.

The end region of the bimetal switch arm 68a has upwardly extending portions 92a adapted to be engaged with the screw head 91a to effect a positive separation of the contacts 70a and 72a when the manually operable member 42a is moved to an "off" position. The auxiliary switch member 122 has an upwardly offset portion 126 carrying a contact 128 for cooperation with the contact 138.

The shaft 40a has a central recess accommodating an insulating lava strut or pin 130, the pin 130 extending through an elongated opening 132 in the auxiliary switch member 122, the tip portion of the pin engaging the upper surface of the bimetal switch member 66a whereby manual rotation of the shaft 40a causes movement or flexure of the switch arm 66a.

The auxiliary switch member 122 is normally prestressed to engage contact 138 with contact 124, while the bimetal switch members 66a and 68a are normally prestressed to occupy uppermost positions as permitted by the position of the strut 130 controlled by the knob 42a.

The inherent stress of the bimetal switch arm 66a in an upward direction is substantially greater than the stress of the switch member 122, the difference in the stress factors urging the switch member 122 toward a position engaging the contacts 128 and 138.

When the control knob 42a is in an "off" position, the bimetal arm 66a is in its uppermost position and contacts 70a and 72a are disengaged by reason of the abutment screw head 91a preventing upward movement of the bimetal switch arm 68a, the bimetal arm 66a elevating the switch member 122 to disengage contact 128 from contact 138. Thus, in an "off" position, the contacts 70a and 72a are out of engagement and the contacts 138 and 128 out of engagement to interrupt current flow through both switch mechanisms.

The arrangement shown in FIGURES 6 through 9 is particularly adapted for controlling two instrumentalities, one of which is controlled through the thermostatic action of the bimetal switch arms 66a and 68a. For example, the switch mechanisms may be used as a unit control for a hair dryer wherein the circuit through the bimetal switch arms 66a and 68a controls current flow to the heating element of the hair dryer and the auxiliary switch member 122 and contacts 138 and 128 control the circuit of a fan motor for circulating heated air of the hair dryer.

When it is desired to bring the switch means into circuit completing positions, the operator rotates the knob 42a away from "off" position, which rotation, through the medium of the strut 130, moves or flexes the bimetal switch arm 66a downwardly. As the switch arm 66a is flexed downwardly, the inherent prestressed condition of the switch arm 122 flexes the switch arm 122 downwardly to engage the contacts 138 and 128, energizing the auxiliary circuit to the fan motor of a hair dryer.

Downward flexure of the switch arm 66a engages the contacts 72a and 70a and flexes the lowermost bimetal switch arm 68a away from engagment with the screw head 91a, the engagement of contacts 70a and 72a energizing the circuit to the heating element of a hair dryer. The operator sets the control knob 42a to the temperature setting at which it is desired to maintain the heat of the hair dryer. Current to the heating element of the hair dryer flows through the resistance strip 80a generates heat influencing the bimetal elements 66a and 68a to be flexed downwardly but at different rates of flexure.

The rate of flexure of the bimetal member 68a is higher than that of the bimetal member 66a. This arrangement lengthens the period of engagement of the contacts 70a and 72a thereby extending the duration of the heating cycle and, upon deenergization of the heater strip 80a by disengagement of the contacts, the current "off" period is likewise extended.

The resistance factor of the heater strip 80a is comparatively low so that the rate of heat generated is comparatively low and the duration of engagement of the contacts 70a and 72a extended. The period of cycling may be further altered by modifying the cross sectional area of the strip 80a to thereby change its resistance value.

FIGURES 10, 11 and 11A illustrate a modified form of switch construction that may be mounted in the housing. The housing 12b is of substantially the same construction as the housing 12 shown in FIGURES 1 through 5 and is fashioned of molded lava. The housing includes side walls 14b, 15b, 16b and 17b, the upper edges of the side walls terminating in a planar surface 18b, the walls being integrally joined with a floor portion 20b.

The housing is provided with a cover 24b of the same construction as cover 24a shown in FIGURES 8 and 9, having a planar portion 25b and pairs of side walls, the lower edges of which engage the planar surface 18b of the housing. The cover 24b is provided with depending leg portions (not shown) engaging in recesses 32b in the housing in the same manner as illustrated in FIGURE 8. Planar portion 25b of the metal cover has an opening accommodating an interiorly threaded bushing 36b secured to the housing by swaging at 38b, the bushing accommodating a threaded shaft 40b equipped with a manipulating control knob or member 42b.

The lower surface of the floor 20b is provided with recesses accommodating L-shaped terminals 50b and 52b. The terminal 50b is held in place by a headed shaft or pin 56b which extends through components of the switch mechanism contained in the housing. The switch arrangement shown in FIGURES 10, 11 and 11A is of the single pole type, the position of one of the switch members being controlled by a bimetal element 148, the arrangement including high resistance heating means for effecting cycling of the switch by reason of the varying temperature environment established within the housing.

The switch mechanism includes a flexible switch arm 140 carrying a contact 142, and a second switch arm 144 carrying a contact 146 cooperating with the contact 142. The bimetal element 148 is disposed beneath the switch member 144. Adjacent ends of the switch members 140, 144 are provided with openings to receive mounting means. Disposed between switch members 140 and 144 and surrounding the metal pin 56b is an annular member or collar 150 of rigid insulating material, such as lava, having a tenon portion 152 extending through openings in the switch member 144, bimetal element 148 and a resistance heater strip 154 to insulate these components from the pin 56b.

Surrounding the insulating tenon 152 is a metal collar 156 which spaces the switch member 144 from the bimetal element 148, a second metal collar 158 surrounding the pin being disposed between the bimetal element 148 and the heater strip 154 to establish electrical connection between the switch member 144 and the heater strip 154.

After assembly of these components on the pin 56b the end of the pin is swaged to form a head 86b to retain these components in assembled relation, the terminal 50b also being held in place by the swaged head 86b.

The opposite end of the heater strip 154 has an opening accommodating a pin 60b in metallic contact with a terminal 52b which is secured to the housing by the pin 60b. The heater strip 154 is of serpentine-like configuration to provide a resistance heater of substantial length and occupying a minimum of space. This type of resistance heater, shown in FIGURE 10, is of comparatively high resistance to generate substantial heat during current flow to effect frequent opening and closing of the contacts 142 and 146 to cycle the current flow to an instrumentality controlled by the switch mechanism.

Both switch members 140 and 144 are prestressed to be normally biased to an uppermost position. The switch member 144 is fashioned with a depending end portion 160 which has an opening 161, shown in FIGURE 11A, to accommodate the bimetal element 148, the opening being elongated in a vertical direction in order to facilitate flexing movement of the bimetal element 148 under the influence of temperature variations. The housing floor 20b has an opening accommodating a bushing 88b which is internally threaded to receive a screw 90b having a head 91b.

The extremity of the bimetal element 148 is fashioned with upwardly extending end portions 149 which are adapted for engagement with the screw head 91b to effect a positive disengagement of the contacts 142 and 146 when the control knob 42b is rotated to an "off" position.

The upward movement of switch member 144 is limited by the portion 160 engaging the bimetal element 148 to disengage contacts 142 and 146. The shaft 40b is provided with a recess accommodating a lava strut or insulating pin 164, the lower end of which engages the upper surface of the first switch arm 140 to provide for adjustment of the position of the arm 140 by rotation of the knob 42b.

The operation of the switch shown in FIGURES 10, 11 and 11A is as follows: When the knob 42b is in full "off" position, the upwardly stressed switch arm 140 is in its uppermost position, the contact 142 being disengaged from contact 146 as the uppermost limit movement of switch arm 144 is determined by engagement of the bimetal element 148 with the screw head 91b and engagement of the portion 160 of switch arm 144 beneath the bimetal element 148. In use, the operator rotates the knob 42b to a position for a temperature desired for the appliance or instrumentality to be controlled.

The rotation of the knob 42b and shaft 40b moves the strut 164 downwardly flexing the switch arm 140 to engage contact 142 with the contact 146, completing circuit through the switch mechanism. Current flows through the resistance heater strip 154 to the appliance, the current flow through the heater strip generating heat which is effective to flex the bimetal element 148 downwardly, as viewed in FIGURE 11, and through its interconnection with the portion 160 of the switch arm, 144 disengages the contacts 142 and 146.

The interruption of current flow results in an interruption in the generation of heat from the heater strip 154. When the residual heat is dissipated in the housing and the bimetal element 148 reduced in temperature, it flexes upwardly to again permit reengagement of the contacts 142 and 146 to reestablish the circuit to the appliance.

Figure 12:
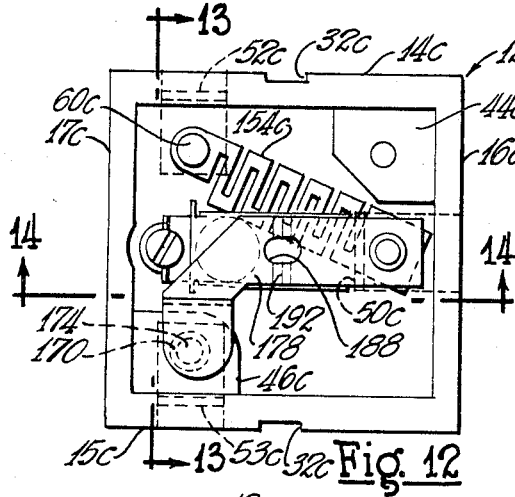
FIGURE 12 is a plan view of the housing and a single pole switch mechanism of the infinite variable type in combination with an auxiliary heating means.
Figure 13:
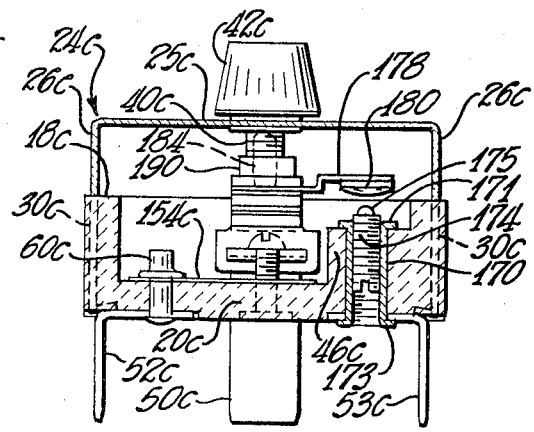
FIGURE 13 is a sectional view taken substantially on the line 13—13 of FIGURE 12.
Figure 14:
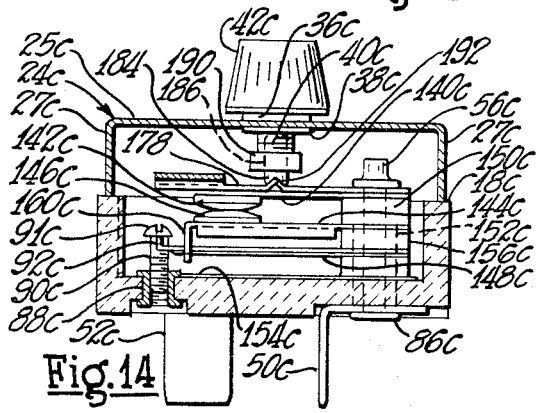
FIGURE 14 is a sectional view taken substantially on the line 14—14 of FIGURE 12.

FIGURES 12 through 14 illustrate a modified form of switch mechanism embodying a main switch means and an auxiliary switch means. The housing construction 12c is the same as hereinbefore described, the housing having opposed side walls 14c, 15c, 16c and 17c and a floor portion 20c integrally formed with the walls, the upper edges of the walls providing a planar surface 18c. A metal cover member 24c is fashioned with a planar portion 25c and pairs of side walls 26c and 27c, the lower edges of the walls being in a common plane to engage the planar surface 18c of the housing walls.

The cover 24c has depending tongues 30c engaging in recesses 32c for securing the cover to the housing in the manner hereinbefore described. The planar portion of the metal cover 24c has an opening accommodating a bushing 36c secured to the cover by swaging as at 38c. The bushing 36c is internally threaded to receive a threaded shaft 40c equipped with a manipulating knob 42c. The housing has integral raised portions or bosses 44c and 46c.

The housing 12c is equipped with terminals 50c, 52c and 53c, the terminals fitting into recesses provided in the lower surface of the floor 20c. The terminal 50c is secured to the housing by a headed pin 56c, and the terminal 52c secured to the housing by a pin 60c. As shown in FIGURE 13, the opening in the boss 46c accommodates an internally threaded sleeve 170 having a shoulder 171 engaging the upper surface of the boss, the sleeve extending through an opening in the terminal 53c and swaged as at 173 to secure the terminal in position.

The sleeve 170 receives a threaded member 174, the projection 175 theron forming a contact of the switch mechanism. The threaded member 174 is rotatable for adjusting the relative position of the contact portion 175. The switch construction includes a first flexible switch arm or member 140c carrying a contact 142c, and a second switch arm 144c carrying a contact 146c which cooperates with contact 142c. The switch arms 140c and 144c are of flexible metal but are not of bimetal construction. The bimetal element 148c is disposed beneath the switch arm 144c.

The switch construction includes a second switch means comprising a flexible switch arm 178 carrying a contact 180 adapted for cooperation with the adjustable contact 175. Adjacent ends of the switch members 178, 140c, 144c and the bimetal element 148c are arranged to accommodate mounting means to form a stacked switch construction.

Disposed between switch members 140c and 144c and surrounding the pin 56c is an annular member 150c having a tenon portion 152c extending through openings in the switch member 144c, bimetal element 148c and a resistance heater strip 154c to insulate these components from the metal pin 56b.

A metal collar 156c spaces the switch member 144c from the bimetal element 148c, and a second metal collar spaces the bimetal element 148c from the heater strip 154c, the metal collars surrounding the tenon 152c and establishing electrical connection between the switch member 114c and the heater strip 154c. After assembly of the several components on the pin 56c, the lower end of the pin in swaged to form a head portion 86c for retaining the said components and terminal 50c in fixed relation. The resistance heater strip 154c has an opening receiving the pin 60c, the pin establishing electrical connection between the terminal 52c and the heater strip 154c.

The heater strip 154c is of serpentine-like shape providing a high resistance heater of substantial length of the same character as the strip 154 shown in FIGURE 10. The heater strip 154c is of a character to generate substantial heat by high resistance to current flow in order to effect frequent opening and closing of the contacts 142c and 146c to cycle current flow to the appliance. Disposed in an opening int he housing floor 20c is an internally threaded metal bushing 88c accommodating a screw 90c having a head 91c.

The bimetal element 148c has upwardly extending portions 92c adapted to engage the screw head 91c to effect a positive separation of contacts 142c and 146c when the manual control knob 42c is rotated to an "off" position. The switch member 144c has a depending portion 160c of the character shown at 160 in FIGURE 11A, the portion 160c being slotted to accommodate the bimetal element 148c. Engagement of portions 92c with the screw head 91c defines the uppermost position of flexure or movement of the switch member 144c through engagement of the portion 160c with the bimetal element 148c.

The manually rotatable shaft 40c has a recess accommodating a strut or pin 184 of lava, the pin having a tenon portion 186, the lower end of which extends through an elongated opening 188 in the switch member 178 and engages the upper surface of the switch member 140c. Surrounding the tenon portion 186 of the pin 184 is a collar or annular member 190 of lava or other rigid insulating material, the collar 190 being adapted for engagement with raised ridges 192 provided on the switch arm 178 whereby downward movement of the collar 190 by rotation of the shaft 40c effects engagement of collar 190 with the ridges 192.

In the operation of the switch mechanism, with the manipulating knob 42c in an "off" position the collar 190 is in its uppermost position and as the switch arm 178, prestressed in an upward direction, is in a position separating contact 180 from contact 175.

In an "off" position of the knob 42c, contacts 142c and 146c are out of engagement. Rotation of the knob 42c from an "off" position, moves the collar 190 and pin 184 to flex switch arms 178 and 140c to engage contacts 142c and 146c, and to engage contacts 175 and 180 to complete circuits through both switch means.

The switch of the character shown in FIGURES 12 through 14 may be used as a sequence switch for controlling a fan motor and heater of a hair dryer. The contact screw 174 is adjusted so that initial movement of the knob 42c from an "off" position flexes the switch arm 178 to engage contact 180 with contact 175 to complete a circuit to a motor driven fan or blower of a hair dryer appliance. When the knob 42c is further moved to a temperature setting at which it is desired to maintain the hair dryer, the switch member 140c is flexed downwardly by the tenon portion 186 of the pin 184 to engage contacts 142c and 146c to complete a circuit to a heating element (not shown) of the hair dryer.

Thereafter, the heat generated by current flow through the resistance strip 154c influences the bimetal element 148c flexing the same downwardly to thereby flex the switch arm 144c downwardly and interrupt current flow through the contacts 142c and 146c. Such action does not interrupt the circuit through the switch member 178. When the bimetal 148c is cooled by reason of de-energization of the heater strip 154c, contacts 142c and 146c are again reengaged upon dissipation of residual heat in the housing and the heating element of the hair dryer again energized.

Thus the switch mechanism shown in FIGURES 12 through 14, when used for control of a hair dryer appliance maintains the heat of the appliance at a predetermined desired temperature through the cycling of the contacts 142c and 146c without interrupting the circuit to the fan motor through the contacts 175 and 180.

Figure 15:
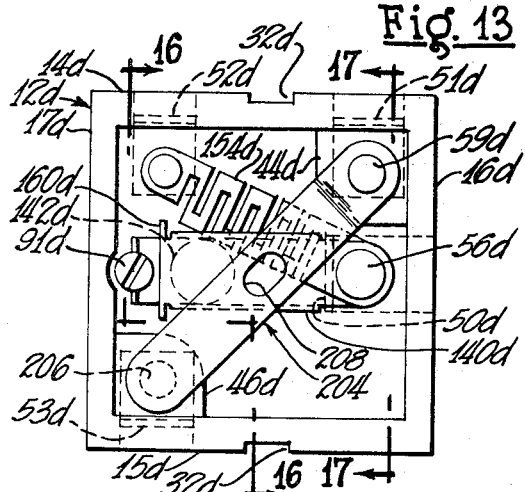
FIGURE 15 is a plan view of the housing and a double pole thermostat switch construction in combination with an auxiliary heater.
Figure 16:
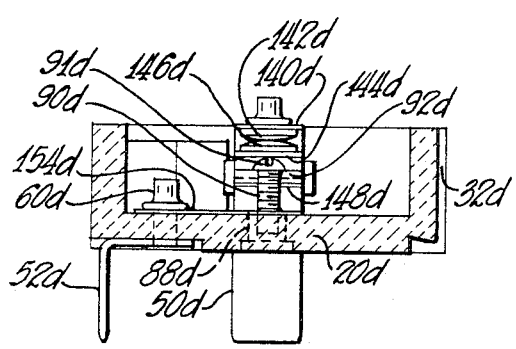
FIGURE 16 is a sectional view taken substantially on the line 16—16 of FIGURE 15.
Figure 17:
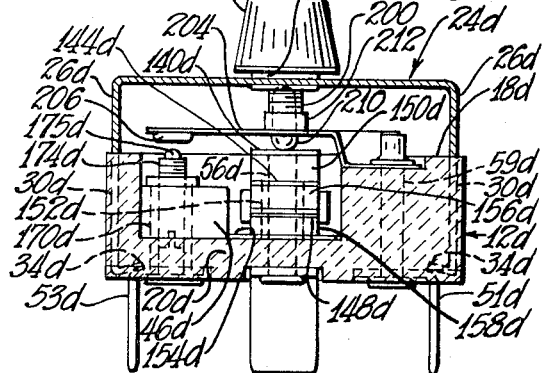
FIGURE 17 is a sectional view taken substantially on the line 17—17 of FIGURE 15.

The switch construction shown in FIGURES 15 through 17 is a double pole switch embodying a thermoresponsive element for controlling the circuit through one of the pole switch means. The housing 12d is of the same construction as in the other forms of the invention, the housing including side walls 14d, 15d, 16d and 17d, and a floor 20d, the upper edges of the side walls providing a planar surface 18d engaged by side walls of a metal cover 24d of the construction shown in FIGURES 13 and 14, the side walls 26d having tongues 30d fitting into recesses 32d with portions 34d engaging the housing at the ends of the recesses 32d.

A bushing 36d secured to the cover 24d is internally threaded to accommodate a threaded shaft 200 supporting a rotatable manipulating knob 42d. The housing 12d includes integral raised portions or bosses 44d and 46d. The housing is provided with terminals 50d, 51d, 52d and 53d supported in recesses on the floor portion 20d of the housing. The switch construction includes a first switch member 140d carrying a contact 142d and a second switch member 144d carrying a contact 146d which cooperates with contact 142d.

The arrangement includes a bimetal element 148d. The switch members 140d, 144d and the bimetal element 148d are of the same construction as the corresponding components shown in FIGURE 14. These components are supported on a pin 56d. An annular insulating member 150d has a tenon portion 152d extending through openings in the switch member 144d and the bimetal element 148d for insulating these components from the pin 56d. Metal collars 156d and 158d respectively space the switch member 144d from bimetal element 148d and the bimetal element from a resistance heater strip 154d supported on the housing floor.

The switch member 140d has a depending end portion 160d provided with a slot accommodating the bimetal member 148d in the manner illustrated in FIGURES 11 and 11A. The housing floor has an opening accommodating an internally threaded bushing 88d which receives a screw 90d having a head 91d which is engaged by upwardly extending portions 92d on the bimetal element 148d for limiting the upward movement of the switch member 144d to assure a positive disengagement of contacts 142d and 146d when the control knob 42d is in an "off" position.

The heater strip 154d has an opening accommodating a pin 60d establishing electrical contact with the heater strip 154d with the terminal 52d.

The arrangement includes a second switch means for interrupting current flow through the other current supply line. The second switch means includes a switch arm 204, one end being anchored to a pin 59d which also secures the terminal 51d to the housing 12d. The switch arm 204 is diagonally arranged in the housing, as shown in FIGURE 15, and carries a contact 206 at its distal end.

The boss portion 46d of the housing has an opening accommodating an internally threaded sleeve 170d which receives a threaded member 174d having a contact portion 175d for cooperation with the contact 206, the sleeve 170d securing the terminal 53d to the housing. The switch arm 204 has an elongated opening 208 accommodating a lava strut or pin 210 mounted in a recess in the shaft 200.

An insulating collar 212 disposed between the end of the shaft 200 and switch member 204 is of a dimension whereby rotation of the knob 42d to current "on" position flexes the switch member 204 downwardly to engage contacts 175d and 206 while the strut 210 bears against the switch arm 140d to flex it downwardly and thereby engage contacts 142d and 146d to complete the circuits through both conductors of the current supply.

When the knob 42d has been rotated by the user to the desired temperature range at which an appliance is to be controlled and the circuits completed through both sets of contacts, the thermoresponsive or bimetal element 148d, under the influence of heat from the heater strip 154d automatically maintains the appliance at the desired temperature.

FIGURES 18 through 20 illustrate another form of switch mechanism of the invention. The housing construction 12e is of the same character as the housing construction hereinbefore described and includes side walls 14e, 15e, 16e and 17e, the upper edges providing a planar surface 18e, the housing having a floor portion 20e. The housing is provided with a cover 24e having a planar portion 25e and side walls, the cover being of the same construction hereinbefore described.

The side walls of the cover engage the surface 18e, the cover having tongues (not shown) fitting in recesses 32e in the walls 14e and 15e of the housing for securing the cover to the housing in the manner hereinbefore described. An internally threaded bushing 36e is secured to the planar portion 25e of the cover and is swaged as at 38e to secure the bushing to the cover. A threaded shaft 40e is received in the bushing and a manipulating knob 42e is secured on the shaft.

The housing 12e is fashioned with integral portions or bosses 44e and 46e. The housing is equipped with terminals 50e, 51e, 52e and 53e. Terminal 50e is secured to the housing by a headed pin 56e, terminal 51e secured by a pin 59e, terminal 52e secured by a pin 60e, and the terminal 53e secured by a sleeve 170e. A first switch means includes a first flexible switch arm 220 carrying a contact 222, and a second switch arm 224 carrying a contact 226 for cooperation with contact 222. A thermoresponsive or bimetal element 228 is provided for influencing the position of the switch arm 224 but is mounted independently of the switch arm.

Surrounding the pin 56e and disposed between the switch member 220 and the bimetal element 228 is an annular member 230 of lava or other rigid insulating material. The insulating member 230 is fashioned with a tenon portion 232 surrounding the pin and extending through openings in the bimetal element 228, the switch arm 224 and a resistance heater element or strip 80e to insulate these components from the pin 56e. The switch member 224 is spaced from the bimetal element 228 and heater strip 80e by annular insulating members 233 and 235 surrounding the tenon portion 232. The heater strip 80e is engaged by the pin 60e establishing electrical connection of the strip 80e with the terminal 52e.

The bimetal element 228 is disposed between the switch members 220 and 224, the switch member 224 having a raised portion 236 adapted to be engaged by the bimetal element 228 when the latter is flexed downwardly under the influence of heat established by current flow through the resistance strip 80e to move the switch member 224 downwardly and disengage contacts 222 and 226. The housing floor 20e has an opening accommodating an internally threaded bushing 88e receiving a threaded member or screw 90e having a head 91e.

The distal end of the switch member 224 has upwardly extending portions 238 adapted to engage the screw head 91e to effect a positive separation of contacts 222 and 226 when the control knob 42e is in an "off" position.

The arrangement shown in FIGURES 18 through 20 includes a second switch means comprising a flexible switch arm or member 240, one end being secured to the upper surface of the boss portion 44e by the pin 59e, the distal end of the switch arm 240 provided with a contact 242.

The sleeve 170e, carried by the housing boss portion 46e is internally threaded to accommodate a threaded member 174e having a contact portion 175e providing a contact for cooperation with the contact 242 on the switch arm 240. The threaded shaft 40e is recessed to accommodate a lava pin 210e which projects through an elongated opening 244 in switch arm 240 and engages the switch member 220. The position of the switch member 220 is manually controlled by rotation of the knob 42e. Surrounding the pin 210e is an annular member or collar 246.

The central region of the switch member 240 is provided with raised ridge portions 248. An annular member 246 of insulating material is positioned between the end of the shaft 40e and the raised ridges 248 whereby downward movement of the pin 210e by rotation of shaft 40e flexes the switch arm 240 downwardly, as viewed in FIGURE 19, to engage contact 242 with contact 175e and flex the switch arm 220 downwardly to engage contact 222 with contact 226.

Thus rotation of the control member 42e in a direction to move the pin 210e and the collar 246 downwardly, engages contacts 242 and 175e to complete a circuit through one side of the current supply line, and engages contacts 222 and 226 to complete the circuit through the other side of the current supply line.

When the sets of contacts are in engagement, current flows through the resistance heater strip 80e generating heat influencing the bimetal element 228 to be flexed downwardly to engage the raised portion 236 and flex the switch member 224 downwardly to separate contacts 222 and 226 and thereby interrupt current flow to the appliance being controlled.

When these contacts are disengaged, the heater strip 80e is de-energized, the residual heat in the housing is soon dissipated and the temperature of the bimetal element 228 reduced, causing the bimetal element to be flexed upwardly, enabling reengagement of the contacts 222 and 226 to reestablish current flow. In this manner current flow is cycled intermittently to the appliance connected with the switch means.

FIGURES 21 through 23 illustrate another form of switch mechanism of the invention. The housing construction 12f is of the same character as the housing construction hereinbefore described and includes side walls 14f, 15f, 16f and 17f, the upper edges providing a planar surface 18f, the housing having a floor portion 20f. A cover 24f for the housing has a planar portion 25f and side walls, the cover being of the same construction hereinbefore described.

The side walls of the cover engage the housing surface 18f, the cover having depending tongues engaging in recesses 32f in the walls 14f and 15f of the housing for securing the cover to the housing.

An internally threaded bushing 36f is secured in an opening in the planar portion 25f of the cover and is swaged as at 38f to secure the bushing to the cover. A threaded shaft 40f is received in the bushing and a manipulating knob 42f is secured on the shaft.

The housing 12f is fashioned with diagonally arranged integral portions or bosses 44f and 46f. The housing is equipped with terminals 50f, 51f, 52f and 53f. Terminals 50f, 51f and 52f are secured to the housing by pins 56f, 59f and 60f. The terminal 53f is secured by a sleeve 170f. A first switch means includes a first flexible switch arm 220f carrying a contact 222f, and a second switch arm 224f carrying a contact 226f for cooperation with contact 222f. A thermoresponsive or bimetal element 228f is provided for influencing the position of the switch arm 224f but is mounted independently of the switch arm.

A second switch means includes a switch arm 260 having an opening accommodating the pin 56f and engages a flange 82f thereof, the second switch means being hereinafter described. A current conductor 262 has one end in contact with pin 59f and the other end region in contact with the switch arm 220f. Surrounding the pin 56f and disposed between the switch member 260 and the current conductor 262 is an annular member 264 of lava or other rigid insulating material.

The insulating member 264 is fashioned with a tenon portion 266 surrounding the pin and extending through openings in the current conductor 262, switch arm 220f, bimetal element 228f, switch arm 224f and a resistance heater element or strip 80f to insulate these components from the pin 56f. The bimetal element is spaced from the switch members 220f and 224f by insulating members 270 and 272 surrounding the tenon portion 266, and a metal member 274 is disposed between heater strip 80f and switch arm 224f. The heater strip 80f is engaged by the pin 60f to establish electrical connection between the strip 80f and the terminal 52f.

The switch member 224f is provided with a raised portion 236f adapted to be engaged by the bimetal element 228f when the latter is flexed downwardly under the influence of heat set up by current flow through the resistance strip 80f to move the switch member 224f downwardly for disengaging contacts 222f and 226f. The floor 20f of the housing is provided with an opening accommodating an internally threaded bushing 88f, the bushing receiving a threaded member or screw 90f having a head portion 91f.

The distal end of the switch member 224f is provided with upwardly extending portions 238f adapted to engage the screw head 91f to effect a positive separation of contacts 222f and 226f when the control knob 42f is rotated to an "off" position. The second switch means comprises the flexible switch arm or member 260, the distal end thereof carrying a contact 268.

The sleeve 170f, carried by the housing boss portion 46f is internally threaded to accommodate a threaded member 174f having a contact portion 175f providing a contact for cooperation with the contact 268 carried by the switch arm 260.

The threaded shaft 40f is recessed to accommodate a laval pin 210f which projects through an elongated opening 276 in the switch arm 260 and engages the switch member 220f whereby the position of the switch member 220f is manually positioned by rotation of the control knob 42f. Surrounding the pin 210f is an annular member or collar 246f. The central region of the switch member 260 is provided with raised ridge portions 278. The member 246f is disposed between the end of the shaft 40f and the raised ridges 278 whereby downward movement of the pin 210f by rotation of shaft 40f flexes the switch arm 260 downwardly as viewed in FIGURE 22 to engage the contact 268 with the contact 175f and flex the switch arm 220f downwardly to engage contact 222f with contact 226f.

Thus rotation of the control member 42f in a direction to move the pin 210f and the annular member 246f downwardly engages contacts 268 and 175f to complete a circuit through one side of the current supply line, and engages contacts 222f and 226f to complete the circuit through the other side of the current supply line. Current through the first switch means flows from terminal 52f through heater strip 80f, metal collar 274, switch member 224f, contacts 226f and 222f, switch member 220f, current conductor 262 and pin 59f to terminal 51f. Current through the second switch means flows from terminal 50f through the pin 56f, switch member 260, contact 268, contact 175f, threaded member 174f and sleeve 170f to the terminal 53f.

When the sets of contacts are in engagement, current flow through the resistance heater strip 80f establishes heat influencing the bimetal element 228f to be flexed downwardly to engage the raised portion 236f and move or flex the switch member 224 downwardly to separate contacts 222f and 226f and thereby interrupt current flow to the appliance being controlled.

When these contacts are disengaged, the heater strip 80f is de-energized, the residual heat in the housing is soon dissipated and the temperature of the bimetal element 228f reduced causing the bimetal element to be flexed upwardly, enabling reengagement of the contacts 222f and 226f to reestablish current flow. In this manner current flow is cycled intermittently to the appliance connected with the switch means.

From the foregoing description it will be apparent that the housing construction is of a character adaptable for enclosing switch mechanisms hereinbefore described whereby a single form of housing may be used for various switch mechanisms. The switch mechanisms disclosed and described are adaptable for controlling various appliances where automatic thermoresponsive control is required.

The housing construction is adaptable to enclose and support switch means of the single pole type, double pole type, and embodying auxiliary resistance heater arrangements for accelerating action of a thermoresponsive element or to obtain repeated cycling of the switch mechanism under the influence of varying temperature environment within the switch housing whereby an infinite switch mechanism is provided for various uses. The switch mechanisms adaptable for enclosure in the housing may have a wide range of current capacities without modification of the housing construction.

It is apparent that, within the scope of the invention, modifications and different arrangements may be made other than as herein disclosed, and the present disclosure is illustrative merely, the invention comprehending all variations thereof.

We claim:
1. Switching mechanism comprising, in combination, a housing of a high temperature resistant rigid insulating material, said housing being substantially rectangular having a floor portion and pairs of opposed side walls, raised boss portions in one pair of diagonally opposite interior corners of the housing integral with the floor portion and adjacent side walls, a plurality of metal terminals, means securing said terminals to the housing, one of said terminal securing means comprising a metal pin extending through an opening in the floor portion at a region spaced from the raised boss portions, a pair of relatively movable contacts resiliently mounted by said pin, insulating means on said pin normally maintaining said contacts in disengaged relation, a resistance heating element in the housing in circuit with one of said contacts arranged to generate heat by current flow therethrough when said contacts are in engagement, a flexible switch arm having one end anchored to one of said boss portions and extending diagonally across the interior of the housing, a contact mounted by the second raised boss portion adapted for cooperation with a contact carried by the diagonally arranged switch arm, a cover for said housing, manually operable means mounted by said cover arranged to vary the relative position of the diagonally arranged switch arm and one of said relatively movable contacts, and thermoresponsive means in said housing operable to vary the relative position of the other of said movable contacts under the influence of temperature variations in the housing.

2. The combination according to claim 1 embodying adjustable abutment means for limiting the relative movement of the contact controlled by the thermoresponsive means in a direction toward the contact adjustable by the manually operable means.

3. The combination according to claim 1 wherein the raised boss portions are of different heights above the floor portion of the housing.

4. Switch mechanism comprising, in combination, a housing of high temperature resistant rigid insulating material, said housing having a floor portion and pairs of opposed side walls, raised boss portions in one pair of diagonally opposed interior corners of the housing integral with the floor portion of the adjacent side walls, a pin extending through an opening in the floor portion, first and second flexible switch arms in said housing mounted by said pin, cooperating contacts carried by said switch arms, a third flexible switch arm anchored at one end to one of said raised boss portions and carrying a contact, a sleeve disposed in an opening in the other raised boss portion, a member adjustably supported by the sleeve and providing a contact for cooperation with the contact on the third switch arm, an electrically resistant heater strip in said housing having connection with one of the switch arms arranged to generate heat by current flow therethrough when the contacts carried by said first and second switch arms are in engagement, thermoresponsive means for the second switch arm for controlling the position of the contact carried thereby under the influence of temperature variations in the housing, a cover for the housing, and manually operable means mounted by the cover for manually adjusting the relative positions of the first and third switch arms.

5. The combination according to claim 4 including abutment means limiting the movement of the second switch arm toward the first switch arm to effect separation of the contacts carried by the first and second switch arms when the manually operable means is moved to an off position.

References Cited

UNITED STATES PATENTS

| | | | |
|---|---|---|---|
| 1,916,669 | 7/1933 | Kuhn et al. | 200—113 |
| 2,499,208 | 2/1950 | Zimmer | 200—122 |
| 2,190,276 | 2/1940 | Smith | 200—138 |
| 2,035,035 | 3/1936 | Weeks | 200—138 X |
| 2,278,629 | 4/1942 | Winning | 200—138 |
| 2,374,967 | 5/1945 | Alexander | 200—138 X |
| 2,611,855 | 9/1952 | Turner | 200—122 X |
| 3,051,808 | 8/1962 | Reffel | 200—138 |
| 3,240,906 | 3/1966 | Huffman | 200—139 X |

BERNARD A. GILHEANY, *Primary Examiner.*

R. COHRS, *Assistant Examiner.*